July 1, 1930.  R. V. RITCHEY  1,769,546
METHOD AND APPARATUS FOR CONVEYING STRIP MATERIAL
Filed April 22, 1929    2 Sheets-Sheet 1
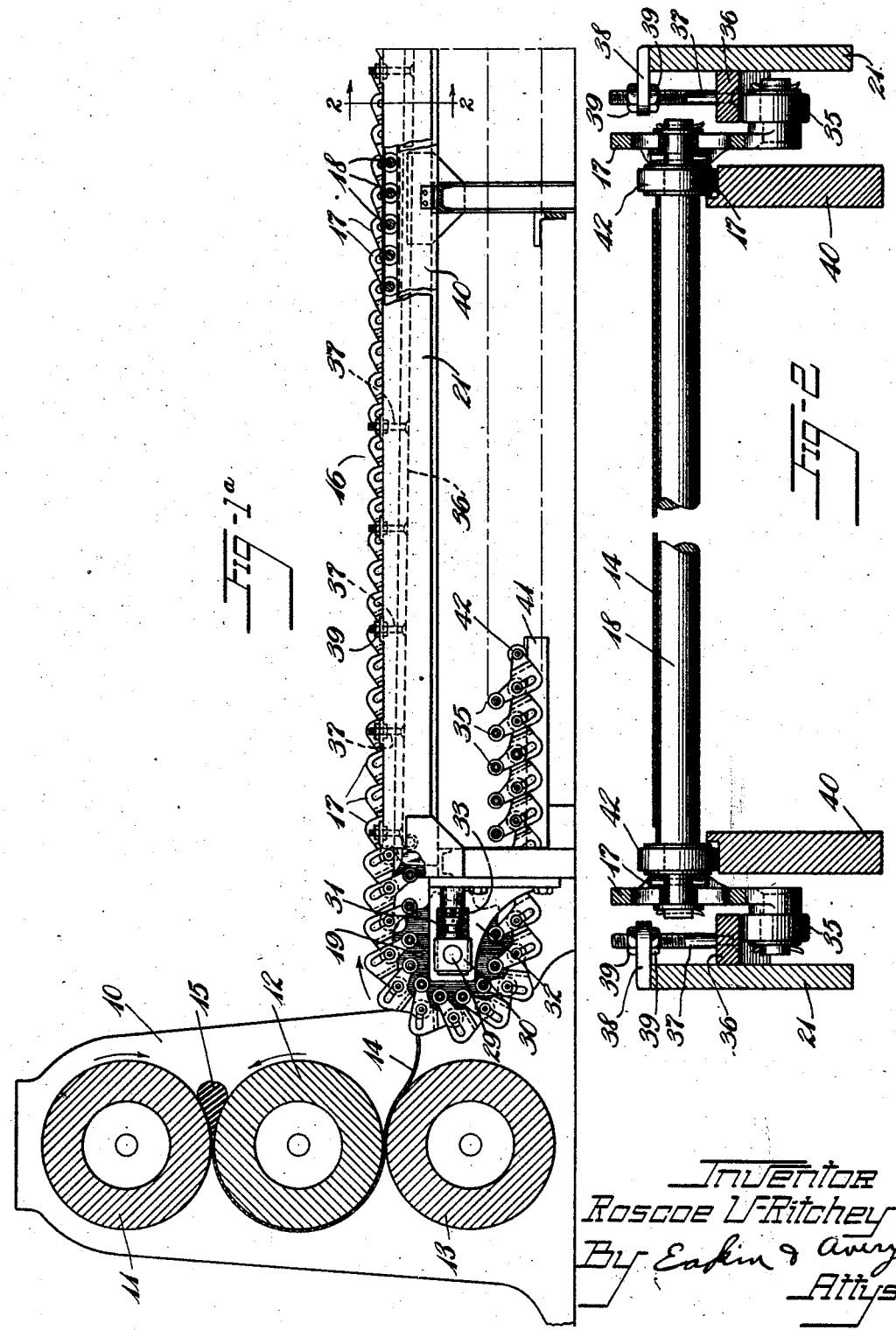

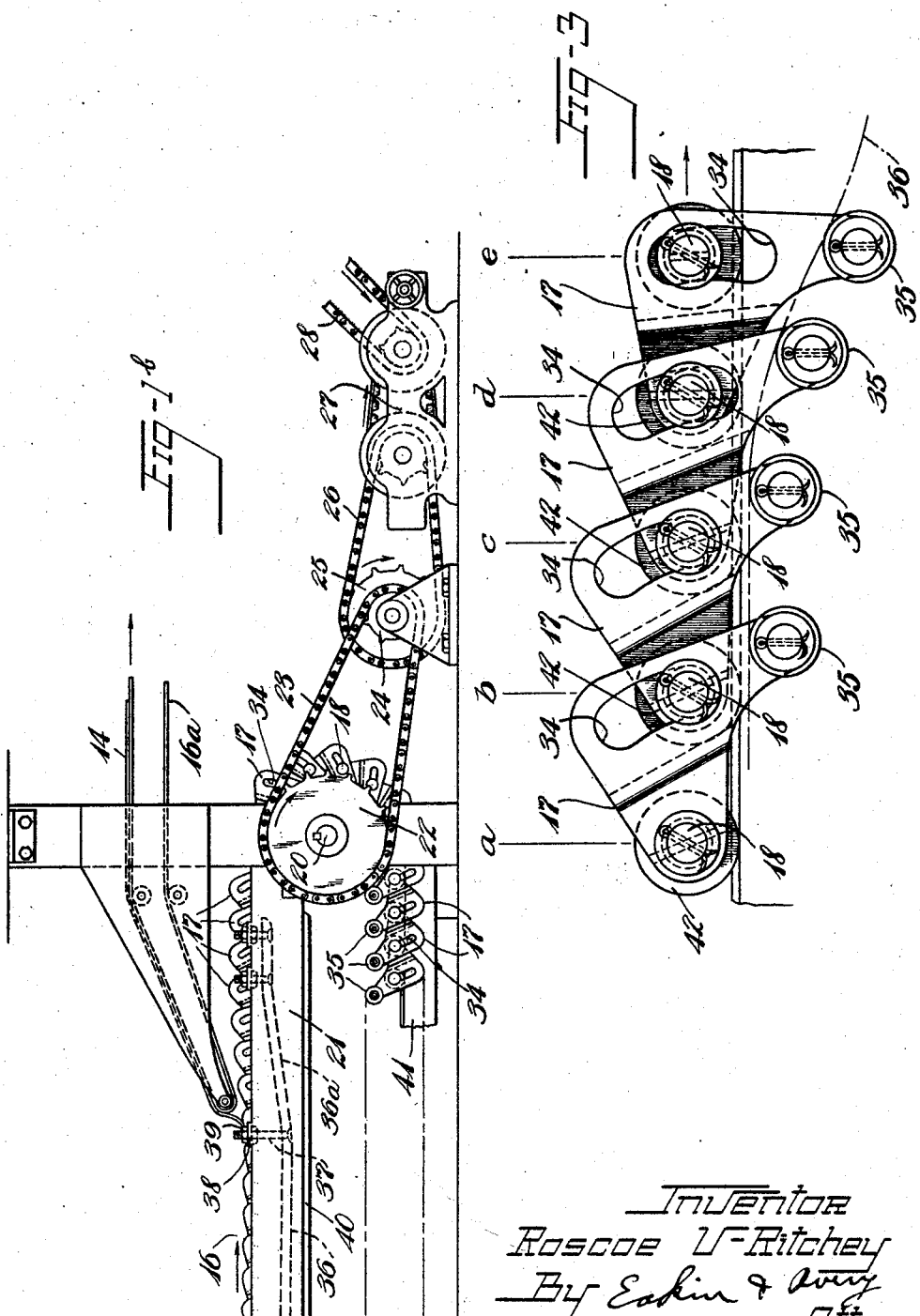

Patented July 1, 1930

1,769,546

UNITED STATES PATENT OFFICE

ROSCOE V. RITCHEY, OF AKRON, OHIO, ASSIGNOR TO THE B. F. GOODRICH COMPANY, OF NEW YORK, N. Y., A CORPORATION OF NEW YORK

METHOD AND APPARATUS FOR CONVEYING STRIP MATERIAL

Application filed April 22, 1929. Serial No. 356,909.

This invention relates to methods and apparatus for conveying strip material, and more especially to procedure and apparatus for feeding strip material longitudinally as the latter contracts in a longitudinal direction.

The invention is of especial value in the rubber industry for processes which utilize a strip or sheet of unvulcanized rubber as the same is continuously delivered from an extruding machine or calender. Such strips or sheets usually have a relatively high rate of longitudinal contraction during the first two or three minutes after leaving the forming machine, and in the manufacture of inner tubes from sheet rubber delivered directly from the calender, it is preferred practice to permit the sheet to contract before it is severed into individual lengths and made into inner tubes. Continuous strips of stock for tire treads usually are formed by extrusion, and upon issuing from the extruding machine are formed with transverse wrinkles due to unequal pressures on the stock within the extruding machine. Such strips usually are initially stretched or elongated to remove the wrinkles and then are permitted to contract before being severed into individual tread slabs.

The chief objects of the invention are to provide improved procedure and apparatus for conveying longitudinally contracting material; to permit the material freely to contract as it is conveyed; and to expedite and/or retard the speed of the feed of the material in local zones. Other objects will be manifest as the specification proceeds.

In general, the present embodiment of my invention comprises an endless conveyor having variable speeds in different regions of its structure and includes a pair of parallel chains to which are secured the ends of transversely disposed, work-supporting bars or rods. The variability of the conveyor's rate of travel is effected by the novel construction of the links comprising the respective chains, which links comprise cam means by which adjacent links are moved toward or away from each other in local zones of the conveyor. In the accompanying drawings, I show the conveyor associated with a calender for forming a continuous rubber sheet which may, for example, be used in the manufacture of inner tubes, in which situation the conveyor is required to travel at progressively diminishing speed in a local region of its orbit to permit free contraction of the sheet material on that portion of the conveyor.

Of the accompanying drawings:

Fig. 1$^a$ is a side elevation of the work-receiving end of apparatus embodying my invention in its preferred form, a part being broken away and a part being in section.

Fig. 1$^b$ is a side elevation of the work delivery end of the apparatus shown in Fig. 1$^a$.

Fig. 2 is a section on line 2—2 of Fig. 1$^a$ on a larger scale.

Fig. 3 is a detail side elevation of a plurality of links of an endless conveyor comprising my invention.

Referring to the drawings, 10 is a calender of the three-roll type provided with rolls 11, 12, 13 adapted to form a continuous sheet of rubber 14 from a bank of unvulcanized rubber composition 15 fed into the bight of rolls 11, 12. Positioned at the delivery side of the calender 10 is an endless conveyor, generally designated 16, embodying my invention, and 16$^a$ is an endless belt conveyor mounted above the conveyor 16 at the delivery end thereof, and adapted to remove the sheet 14 from the conveyor 16 before it traverses completely the upper reach of the latter.

The conveyor 16 comprises two parallel endless chains made up of links 17, 17, and transversely disposed work-supporting bars or rods 18, 18 connecting corresponding links of the respective chains, said chains, at the work-receiving end of the conveyor, being mounted upon respective sprockets such as the sprocket 19, Fig. 1$^a$, and at the delivery end of the conveyor are mounted upon similar sprockets (not shown) which are mounted upon the respective end portions of a drive-shaft 20 suitably journaled in a framework 21. The drive-shaft 20 is provided with a sprocket 22 connected by a sprocket chain 23 with reduction sprockets 24, 25 of which the latter is connected by a sprocket chain 26 with a variable speed device 27 driven by a sprocket chain 28 from a suitable source of power, preferably from the calender drive to assure proper timing. The sprockets 19 are mounted upon a shaft 29 which is journaled in bearing blocks, such as the bearing block 30, Fig. 1ª, mounted in a slideway 31 formed in a bracket 32 secured to the framework 21. An adjustment screw 33 is provided for moving the bearing block 30 in its slideway 31 to insure proper tension of the conveyor 16.

As shown in Fig. 3, each of the links 17 of the conveyor 16 comprises a generally triangular structure which is secured at one corner to one end of a cross-rod 18, and at its side opposite said corner is formed with an arcuate cam-slot 34 eccentrically disposed with relation to the aforesaid cross-rod 18, the hub portion of the adjacent cross-rod 18 extending through said cam slot 34. The arrangement is such that the cross-rods 18 are moved respectively toward or away from each other as the free ends of the links 17 are moved downwardly or upwardly.

For so manipulating the links 17, a corner of each link is provided with a cam-roller 35 which extends laterally therefrom and engages a cam-plate 36, one of the latter being mounted upon each side of the framework 21. Each cam-plate 36 comprises an elongate, somewhat flexible, metal strip which is provided at intervals throughout its length with stud-bolts 37, 37, which extend through laterally-extending ears 38, 38 formed on the upper portion of the framework 21, a pair of nuts 39, 39 being mounted upon each stud-bolt 37, on opposite sides of the ear 38 for axial adjustment of the stud-bolt. The flexible character of the cam-plates 36 permits them to be locally flexed or altered to meet varying conditions or requirements of the work.

The ends of the cam-plates which last engage the links are so positioned as to restore the links to their farthest apart positions with relation to each other so that the cross-rods 18 are uniformly spaced when passing around their sprockets. The end portions of the cam-plates which restore the links to normal, spread apart position, are designated 36ª, and are disposed beneath the superposed belt conveyor 16ª which withdraws the sheet 14 from the conveyor 16, so that the restorative movement of the cross-rods 18 is not transmitted to the work.

For supporting the upper and lower reaches of the conveyor 16 substantially in horizontal position, a pair of flanged rails 40, 40 are mounted in the upper part of the framework 21 at opposite sides thereof, and a similar pair of rails, such as the rail 41, are mounted in the lower part of the framework. Upon each end portion of the cross-rods 18 are journaled respective rollers 42, 42 adjacent the links 17, 17 and said rollers ride upon the rails 40, 41 as they travel between the sprockets at the opposite ends of the conveyor, and are engaged by said sprockets for propelling the conveyor as they pass around the same.

In the operation of the apparatus, the cam plates 36 are positioned to effect the desired movement of the links 17 in the upper reach of the conveyor, either for moving the work-supporting cross-rods 18 toward each other or away from each other or both. Any adjustment of the cam-plates which varies the length of the conveyor as a whole is effected by concurrent adjustment of the sprockets 19 by means of the adjustment screws 33. The conveyor is then driven by the driving mechanism described, and the continuous strip material 14 from the calender 10 is fed onto the conveyor at the adjacent end thereof, and removed from the conveyor by the superposed belt conveyor 16ª, the speed of the latter being synchronized with the speed of the conveyor 16 at the point where the work is removed therefrom.

The operation of the cam-plates 36 in effecting relative lateral movement of the cross-rods 18 will best be understood by reference to Fig. 3 wherein the respective axes of a series of cross-rods 18 are designated $a$, $b$, $c$, $d$ and $e$ respectively. The chain-links 17 secured to rods 18 on centers $a$ and $b$ are not yet engaged by the cam-plate 36, and the chain-links secured to rods 18 on centers $c$ and $d$ are shown in the initial stages of engagement with said cam-plate. The cam-slots 34 are so arranged in the links 17 that angular movement of the latter, downwardly as shown in Fig. 3, effects lateral movement of the cross-rods 18 toward each other, as will be apparent from comparison of the spacing between centers $de$ and $cd$ with the spacing between centers $bc$ and $ab$. The net result of the movement of the cross-rods 18 toward each other as they move laterally as a unit is to produce a local region in the conveyor where its surface speed progressively decreases, which region is balanced by a region where the surface speed correspondingly increases as the cross-rods are restored to normal spacing. The slight forward feeding movement of the cross-rods 18 occasioned by their angular movement during the angular movement of the links 17 secured to their end portions may be compensated for by the extent of such angular movement.

The invention as shown is adapted to permit unrestricted contraction of warm unvulcanized rubber strip or sheet material as the latter is delivered continuously from a calender. The cross-rods 18 are spaced apart to expose substantially all of both sides of the material to the atmosphere to expedite the cooling of the material, and said cross-rods are moved toward each other at a rate and ratio corresponding to the contraction of the material so that said contraction is free and unrestrained.

It will be obvious that if desired the cam-plate 36 may be arranged to cause a moving apart of the cross-rods 18, and a plurality of cross-rods will have sufficient friction with the material so as to impart a longitudinal tension thereto and actually stretch the material.

The invention may be modified within the scope of the appended claims, and I do not limit the claims wholly to the exact procedure or specific construction shown and described.

I claim:

1. The method of conveying strip material which comprises supporting the strip at spaced apart points, feeding the strip longitudinally while maintaining its established relation to the points of support, and concurrently varying the relation of the latter to each other.

2. A method as defined in claim 1 in which the movement of the points of support with relation to each other corresponds substantially to the rate and ratio of contraction of the material.

3. In apparatus for conveying strip material, the combination of a plurality of spaced apart supports for the material, means for moving said supports as a unit while maintaining their established relation to the material, to feed the latter, and means for varying the relation of the supports to each other as they are so moved.

4. In apparatus for conveying strip material, the combination of an endless work-supporting conveyor comprising spaced-apart work-supporting members, means for driving the same, and means for gradually varying the spacing of said work-supporting members by varying the length of a given portion of the conveyor as it is driven.

5. Apparatus as defined in claim 4 including means for removing the work from the conveyor at a determinate position with relation to the part of the conveyor's orbit in which the spacing of the work-supporting members is varied as defined.

6. In apparatus for conveying strip material, the combination of a pair of parallel endless chains, work-supporting means connecting the corresponding links of the two chains, means for driving the chains, and means for varying the spacing of successive chain-links as the chains are driven.

7. In apparatus for conveying strip material, the combination of a pair of parallel endless chains each link of which comprises a cam, work-supporting rods connecting corresponding links of the respective chains and operatively engaged with the cam portions of adjacent links, means for driving the chains, and means for so manipulating the chain links as to effect relative movement of the work-supporting rods with relation to each other.

8. In apparatus for conveying strip material, the combination of a pair of parallel endless chains of which each link comprises a cam, work-supporting cross-rods connecting corresponding links of the respective chains and operatively engaged by the cam portions of adjacent links, means for driving the chains, and a pair of cams adapted to manipulate the respective links of the pair of chains, as they are driven, to cause the cam portions of said links to effect relative lateral movement of the cross-rods with relation to each other.

9. Apparatus as defined in claim 8 in which the link-manipulating cams are composed of flexible material, including means for locally flexing said cams.

In witness whereof I have hereunto set my hand this 10th day of April, 1929.

ROSCOE V. RITCHEY.